(12) United States Patent
Kaimal (10) Patent No.: US 9,122,546 B1
(45) Date of Patent: Sep. 1, 2015

(54) RAPID PROCESSING OF EVENT NOTIFICATIONS

(75) Inventor: Biju Kaimal, Bangalore (IN)

(73) Assignee: EMC Corporation, Hopkinton, MA (US)

(*) Notice: Subject to any disclaimer, the term of this patent is extended or adjusted under 35 U.S.C. 154(b) by 928 days.

(21) Appl. No.: 13/245,966

(22) Filed: Sep. 27, 2011

(51) Int. Cl.
- *G06F 9/44* (2006.01)
- *G06F 9/46* (2006.01)
- *G06F 13/00* (2006.01)
- *G06F 9/54* (2006.01)

(52) U.S. Cl.
CPC ..................................... *G06F 9/542* (2013.01)

(58) Field of Classification Search
CPC ....................................................... G06F 9/542
See application file for complete search history.

(56) References Cited

U.S. PATENT DOCUMENTS

| 7,251,829 | B1 | 7/2007 | Pagdin et al. |
| 7,752,663 | B2 | 7/2010 | Nakakoji et al. |
| 8,655,823 | B1* | 2/2014 | Kumar ........................... 706/46 |
| 2007/0067409 | A1* | 3/2007 | Eslambolchi et al. ........ 709/217 |
| 2012/0077468 | A1* | 3/2012 | Fan et al. ................... 455/414.1 |

* cited by examiner

Primary Examiner — H S Sough
Assistant Examiner — Kimberly Jordan
(74) Attorney, Agent, or Firm — BainwoodHuang (57) ABSTRACT

An improved technique of identifying particular events for alerting within an ENMS involves tagging each incoming event notification as having high priority or normal priority according to a set of rules. Those event notifications tagged as having a normal priority are sent directly to a reporting database, while those tagged as having a high priority are sent directly to an alert evaluation module which is configured to generate an alert as a result of an alert evaluation operation performed on an event notification. In order to comply with reporting requirements, however, the improved technique further involves generating a copy of the event notifications tagged as high priority and sending the copies to the reporting database.

21 Claims, 5 Drawing Sheets

RAPID PROCESSING OF EVENT NOTIFICATIONS

BACKGROUND

A conventional event notification management system (ENMS) receives event notifications which describe events such as login attempts at remote devices. Upon receipt of the event notifications, the conventional ENMS stores the event notifications in a database. Some of the event notifications arrive via User Datagram Protocol (UDP) without any prompting by the conventional ENMS; examples of such event notifications which describe "push" events are Syslog messages from Unix-based firewalls, routers and switches. Other event notifications arrive over TCP/IP as a result of the conventional ENMS actively reading a data log on a remote device; examples of such event notifications which describe "pull" events are those stored locally on a Windows®-based device.

Certain events will trigger alerts based on pre-defined alert rules within an ENMS, which alerts are messages which notify an administrator of a high risk of malicious intent on part of a particular user. The conventional ENMS includes an alerting system which performs an alert filtering operation on each event notification stored in the database. The alerting filtering operation determines whether the event described by the event notification requires the alerting system to generate an alert concerning a user associated with the event. For example, the alerting system will look in the database for event notifications describing login failures on a Microsoft Exchange® server.

The conventional ENMS also retains the event notifications in the database in order to analyze long-term trends and comply with reporting requirements.

SUMMARY

Unfortunately, there are deficiencies with the above-described conventional ENMS. For example, the conventional ENMS responds too slowly to events. Specifically, the alert system of the conventional ENMS searches for event notifications to evaluate after the conventional ENMS stores the event notifications in the database. By the time the alert system accesses the database to obtain candidate event notifications for alerting, the devices which are to receive the alerts may be compromised.

The latency described above is a consequence of the conventional ENMS directing all incoming event notifications to the database independent of a likelihood of an event notification requiring the generation of an alert. Because of the reporting requirements, all of the event notifications go to the database, regardless of origin or the nature of the event described. One way to address this latency would be to generate copies of each event notification and send the copies to the alerting system; this would direct the event notifications to the alerting system while maintaining compliance with the reporting requirements. Because the ENMS handles a massive throughput of event notifications, however, sending the event notifications directly to the alert system will cause another unacceptable latency in generating alerts because of the time required to perform the alerting operation.

In contrast to the above-described conventional ENMS in which the alert system processes all event notifications, thus causing an unacceptable latency in generating alerts, an improved technique of identifying particular events for alerting within an ENMS involves tagging each incoming event notification as having high priority or normal priority according to a set of rules. Those event notifications tagged as having a normal priority are sent directly to a reporting database, while those tagged as having a high priority are sent directly to an alert evaluation module which is configured to generate an alert as a result of an alert evaluation operation performed on an event notification. In order to comply with reporting requirements, however, the improved technique further involves generating a copy of the event notifications tagged as high priority and sending the copies to the reporting database.

Advantageously, the improved technique allows for the alert evaluation module to generate alerts quickly and thus reduce the risk of compromising a device on a network. Because an event notification evaluation operation which assigns a priority level to an event notification according to the set of rules is much faster than the alert evaluation operation, latency is reduced greatly. Further, as the expected number of event notifications tagged as having a high priority is typically a small fraction of the total number of incoming event notifications, the additional time needed for a copy operation on the high priority event notifications is insignificant in comparison to the time needed for performing the alert evaluation operation on the incoming event notifications.

One embodiment of the improved technique is directed to a computer-based method of identifying particular events for alerting within an event notification management system. The method includes obtaining a message which includes a set of rules for assigning a priority level of a set of priority levels to an event. The method also includes receiving a first event notification which describes an event. The method further includes assigning a priority level of the set of priority levels to the first event notification, the priority level being based on the set of rules. If the priority level assigned to the first event notification has a value which is greater than a threshold priority level, the method includes providing a second event notification to an alert evaluation module within the event notification management system, the second event notification being based on the first event notification, the alert evaluation module being constructed and arranged to provide an alert based on an event and storing the first event notification on the storage device within the event notification management system. If the priority level assigned to the first event notification has a value which is not greater than a threshold priority level, the method includes storing the first event notification on the storage device.

Additionally, some embodiments of the improved technique are directed to a system for identifying particular events for alerting within an event notification management system. The system includes a network interface coupled to a network, a memory and a processor coupled to the memory, the processor configured to carry the method of identifying particular events for alerting within an event notification management system.

Furthermore, some embodiments of the improved technique are directed to a computer program product having a non-transitory computer readable storage medium which stores code including a set of server instructions to carry the method of identifying particular events for alerting within an event notification management system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are

DETAILED DESCRIPTION

An improved technique of identifying particular events for alerting within an ENMS involves tagging each incoming event notification as having high priority or normal priority according to a set of rules. Those event notifications tagged as having a normal priority are sent directly to a reporting database, while those tagged as having a high priority are sent directly to an alert evaluation module which is configured to generate an alert as a result of an alert evaluation operation performed on an event notification. In order to comply with reporting requirements, however, the improved technique further involves generating a copy of the event notifications tagged as high priority and sending the copies to the reporting database.

Figure 1:
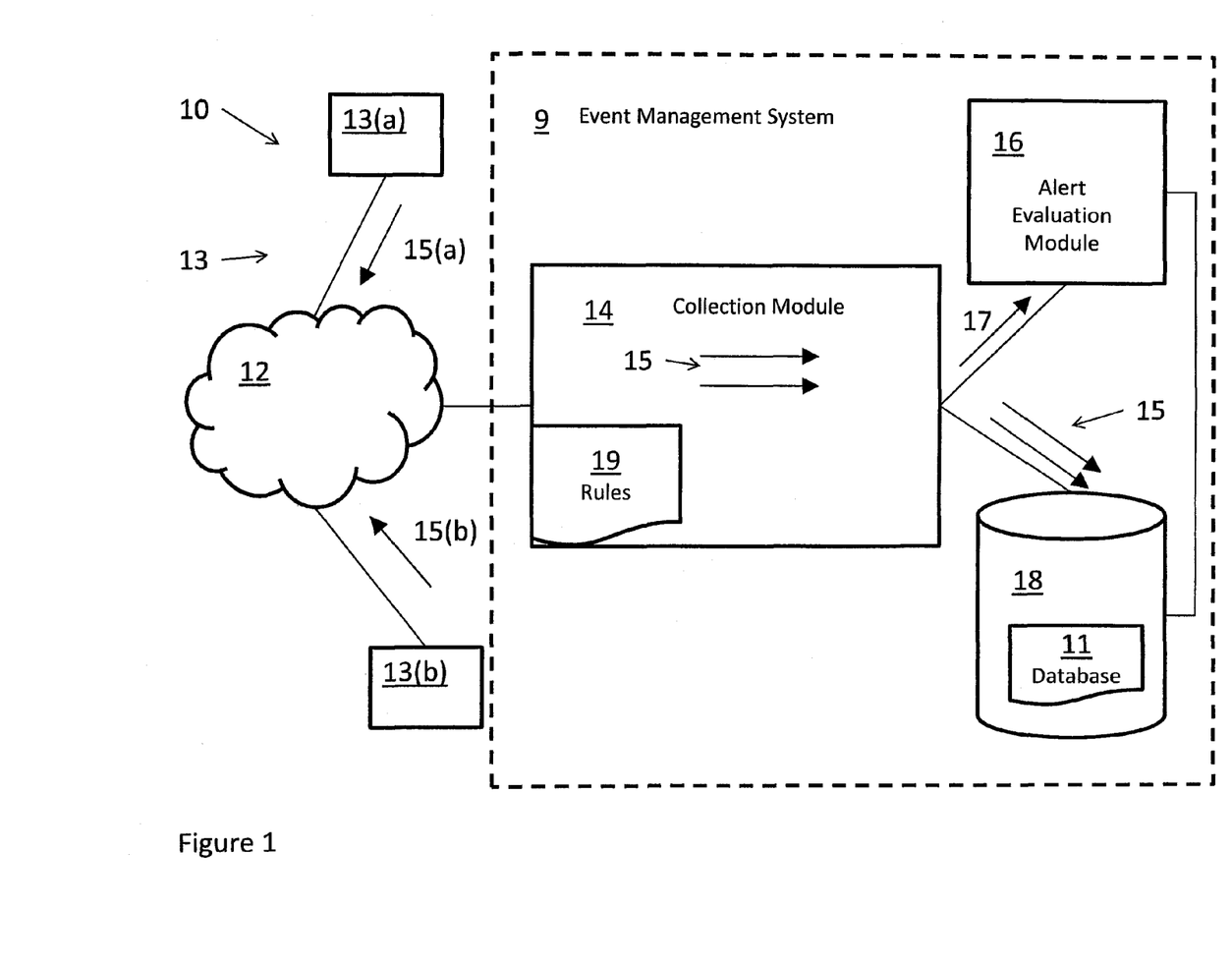
FIG. 1 is a schematic diagram illustrating an electronic environment for carrying out the improved technique.

FIG. 1 illustrates an electronic environment 10 for carrying out the improved technique. Electronic environment 10 includes communications medium 12, event notification management system 9 and devices 13(a) and 13(b) (remote devices 13).

Communication medium 12 provides connections between remote devices 13 and event notification management system 9. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Devices 13(a) and 13(b) (devices 13) are constructed and arranged to process events such as login attempts and the sending and receiving of electronic communications. For example, device 13(a) is a Unix-based router and device 13(b) is a Microsoft Windows®-based application database. In these cases, device 13(a) pushes, or automatically sends, event notification 15(a) to event collector 14 over UDP. On the other hand, device 13(b) stores information about events in an event log on a local storage device; event collector 14 reads the event log and converts information about an event into an event notification 15(b) which event collector 14 pulls, or sends to itself, over TCP/IP.

It should be understood that event notifications 15 take the form of data packets which contain both data about an event within the payload of the data packet and metadata concerning the origin of the event, the operating system of the device, etc., within the header of the data packet.

Event notification management system 9 includes event collector 14, alert evaluation module 16 and storage device 18.

Event collector 14 is constructed and arranged to obtain event notifications 15 for processing according to rules set 19. Specifically, event collector 14 receives the "push" event notification 15(a) from device 13(a). Also, event collector 14 is configured to exchange communications with device 13(b) in order to access a locally stored event log from which event collector 14 generates "pull" event notification 15(b).

Event collector 14 is further constructed and arranged to assign a priority level to an event notification 15 according to a rules set 19. Rules set 19 is configured to provide logical rules by which event collector 14 applies to events described by event notifications 15. That is, the rule includes values of parameters which are described in event notifications 15, and logical operations on those parameter values. For example, a rule in rules set 19 states that login events originating from a Microsoft Windows®-based application database receives a high-priority tag. Event collector 14 reads event confirmations 15 for parameter values EVENT_TYPE and EVENT_ORIGIN to which the rule applies.

It should be understood that, in some arrangements, rules set 19 is based on a set of alert rules which govern how alert evaluation module 16 generates alerts.

Further details of event collector 14 are described below with regard to FIG. 2.

Figure 2:
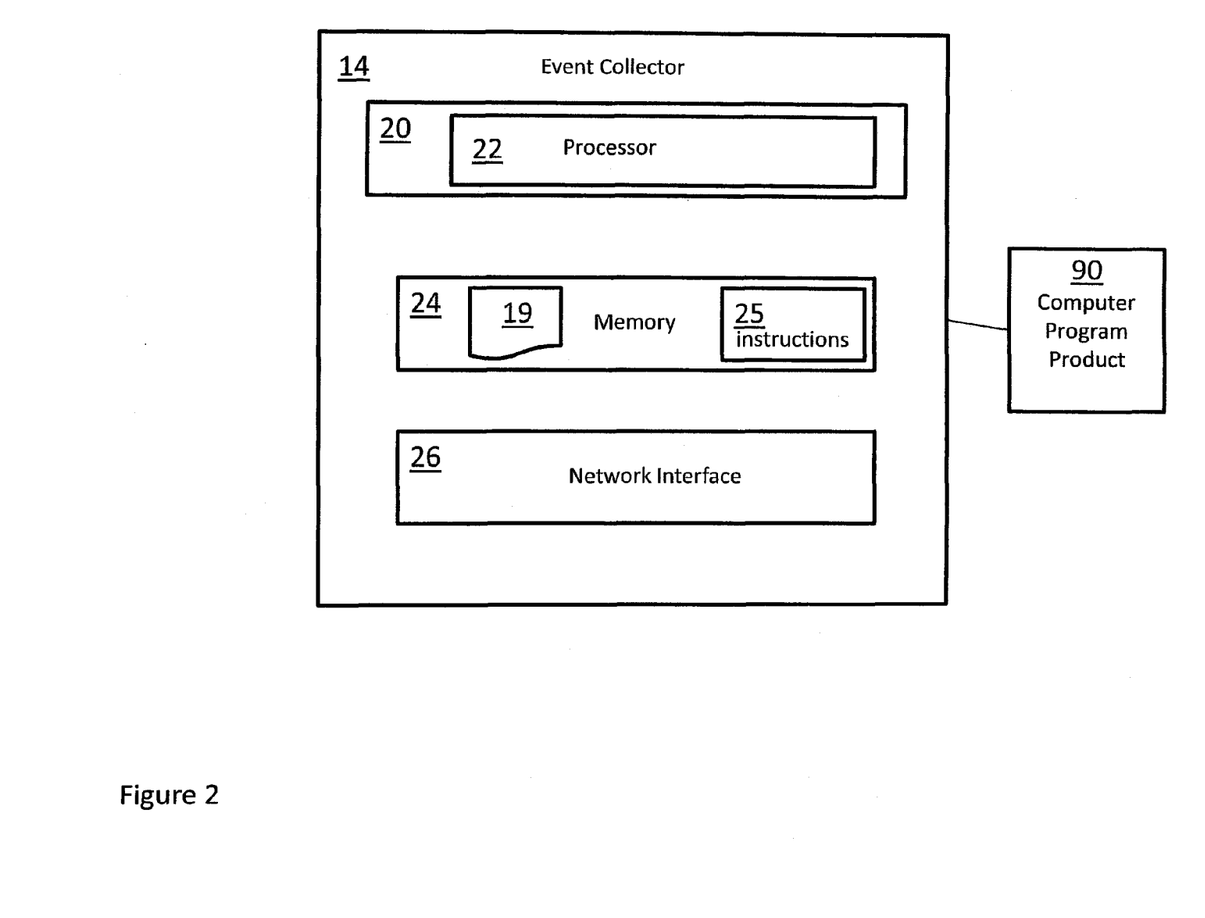
FIG. 2 is a schematic diagram illustrating an event collector within the electronic environment shown in FIG. 1.

FIG. 2 illustrates components of event collector 14. Event collector 14 includes a controller 20 which in turn includes a processor 22, a memory 24 and a network interface 26.

Memory 24 is configured to store code which includes instructions 25 to identify particular events for alerting within event notification management system 9. Memory 24 is further configured to store rules set 19 and data associated with identifying particular events for alerting. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 18. Specifically, network interface 26 is configured to receive event notifications 15 over UDP and TCP/IP. Network interface 26 is also configured to read locally stored event logs of device 13(b) and convert events in the event logs into event notifications 15. Network interface 26 is further configured to send alerts generated by alert evaluation module 16 to devices 13 as needed.

Returning to FIG. 1, alert evaluation module 16 is constructed and arranged to apply an alert evaluation operation to event notification 17. The alert evaluation operation is constructed and arranged to determine whether the event described by event notification 17 requires the generation of an alert to be sent to a systems administrator via network interface 26, which alert contains a message warning the systems administrator about a high risk associated with a particular user. For example, alert evaluation module, as part of the alert evaluation operation, reads the event described in event notification 17 and scans database 11 for long-term trend data concerning the event. Specifically, the event could describe activity originating from a particular IP address, and long-term trend data would have historical data concerning the particular IP address. Based on the event and results of scanning the database, the alert evaluation operation further includes applying a set of alert rules from which a decision whether or not to generate an alert is based.

Storage device 18 is constructed and arranged to store and provide event collector 14 and alert evaluation module 16 access to database 11. Storage device 18 is typically a non-volatile storage device such as a disk array, in particular a RAID array, configured to store database 11, although other storage devices, such as a flash drive, are possible.

Database 11 is constructed and arranged to store events from event notifications 15 in such a way that event parameters are accessible to alert evaluation module 16.

Suppose that event collector receives event notification 15(b) from device 13(b) as a result of a "pull" operation via network interface 26. For example, event notification 15(b) is a description of a login failure from a user having a certain user identifier, IP address, domain name identifier, port number; the login failure event took place at a particular time and was an attempt to gain access to a an account on a certain Microsoft Exchange® server. Upon receipt of event notification 15(b), event collector 14 performs an event notification evaluation operation which identifies particular events for alerting within event notification management system 9, details of which are described below.

As part of the event notification evaluation operation, processor 22 executes, upon receipt of event notification 15(b), instructions 25 to read event parameters and corresponding event parameter values from event notification and store results of the reading into memory 24. That is, parameters identifiers such as EVENT_TYPE, EVENT_OUTCOME, EVENT_ORIGIN, IP_ADDRESS, USER_IDENTIFIER, etc., are stored in memory 24 along with their respective values (e.g., 'login', 'fail', 'Exchange_server', 1.2.3.4, 'username', respectively).

Based on instructions 25, processor 22 then obtains rules set 19 and store rules set 19 into memory 24. Processor 22 then finds rules in rules set 19 stored in memory 24 having parameter identifiers which match parameter identifiers from event notification 15(b). It should be understood that the algorithm employed by processor 22 to match parameters between rules set 19 and event notification 15(b) depends on the structure of event notification 15(b). Further details of the assignment of a priority level are shown with regard to FIG. 3 below.

Figure 3:
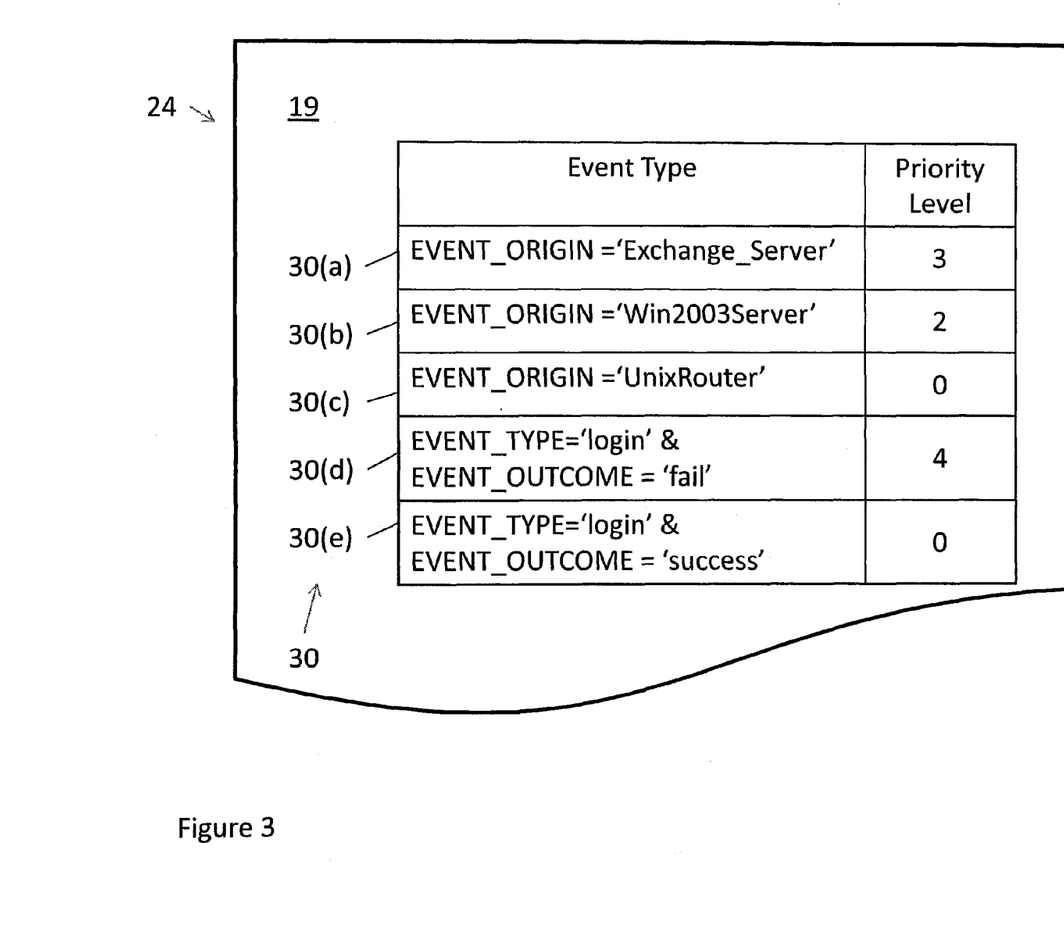
FIG. 3 is a schematic diagram illustrating a rules set used by the event collector shown in FIG. 2.

FIG. 3 shows further details of a particular rules set 19 having individual rules 30(a), 30(b), 30(c), 30(d) and 30(e) (rules 30). Each rule has fields which represent a particular parameter and a corresponding value of the particular parameter. For example, rule 30(a) takes the form "IF EVENT_ORIGIN='Exchange_server' THEN SET PRIORITY_LEVEL=3." In this case, a value of 3 is applied to the parameter PRIORITY_LEVEL. If the value of PRIORITY_LEVEL exceeds a threshold value of PRIORITY_LEVEL which, in this case, is 5, then processor 22 assigns a high priority level to event notification 15(b). Because of rule 30(d), which takes the form "IF EVENT_TYPE='login'" & EVENT_OUTCOME='fail' THEN SET PRIORITY_LEVEL=4, a further score of 4 is applied to the parameter PRIORITY_LEVEL, making the total value of PRIORITY_LEVEL equal to 7, which exceeds the threshold value of PRIORITY_LEVEL. Processor 22 then assigns a high priority level to event notification 15(b).

Alternatively, suppose that event collector receives event notification 15(a) from device 13(a) as a result of a "push" operation via network interface 26. For example, event notification 15(a) is a description of a login failure from a user having a certain user identifier, IP address, domain name identifier, port number; the login failure event took place at a particular time and was an attempt to gain access to a UNIX-based router. In this case, processor 22 applies rules 30(c) and 30(d) to obtain a value of PRIORITY_LEVEL=4. As this is smaller than the threshold value of PRIORITY_LEVEL, processor 22 assigns a normal priority level to event notification 15(a).

Because event notification 15(a) is a normal priority event notification, processor 22 sends event notification 15(a) for storage in database 11. On the other hand, event notification 15(b) is a high priority event notification; in this case, processor 22 executes further instructions to send event notification 15(b) directly to alert evaluation module 16. Nevertheless, because all event notifications 15 are to be stored in database 11 for compliance purposes as described above, processor 22 makes a copy 17 of high priority event notification 15(b). Processor 22 then sends event notification copy 17 (to which referral is made as "event notification 17" hereinafter) to alert evaluation module 16 while sending event notification 15(b) to database 11.

It should be understood, however, that event notification 17 need not be a precise copy of event notification 15(b). For example, event notification 17 contains information such a value of the PRIORITY_LEVEL parameter which is not contained in event notification 15(b).

In some arrangements, processor 22 uses an alert table on which rules table 19 is based to determine a schedule of collections for "pull" operations. For example, a rule of the alert table is as follows: "IF IP_ADDRESS=10.0.0.1 OR 10.0.0.2 OR 10.0.0.3 AND COUNT(LOGIN_FAILURE)>3 in less than 5 minutes, then ALERT;" if devices at 10.0.0.1 and 10.0.0.2 are "pull" devices (say, Windows computers) and 10.0.0.3 is a "push" device (say, Cisco Firewall), then processor 22 can prioritize collection for the two Windows devices before collection for other Windows devices (say, 10.0.0.4, 10.0.0.5, etc, which are not part of the alert rule).

Further details of how processor 22 sends event notification 17 to alert evaluation module 16 are shown below with regard to FIG. 4.

Figure 4:
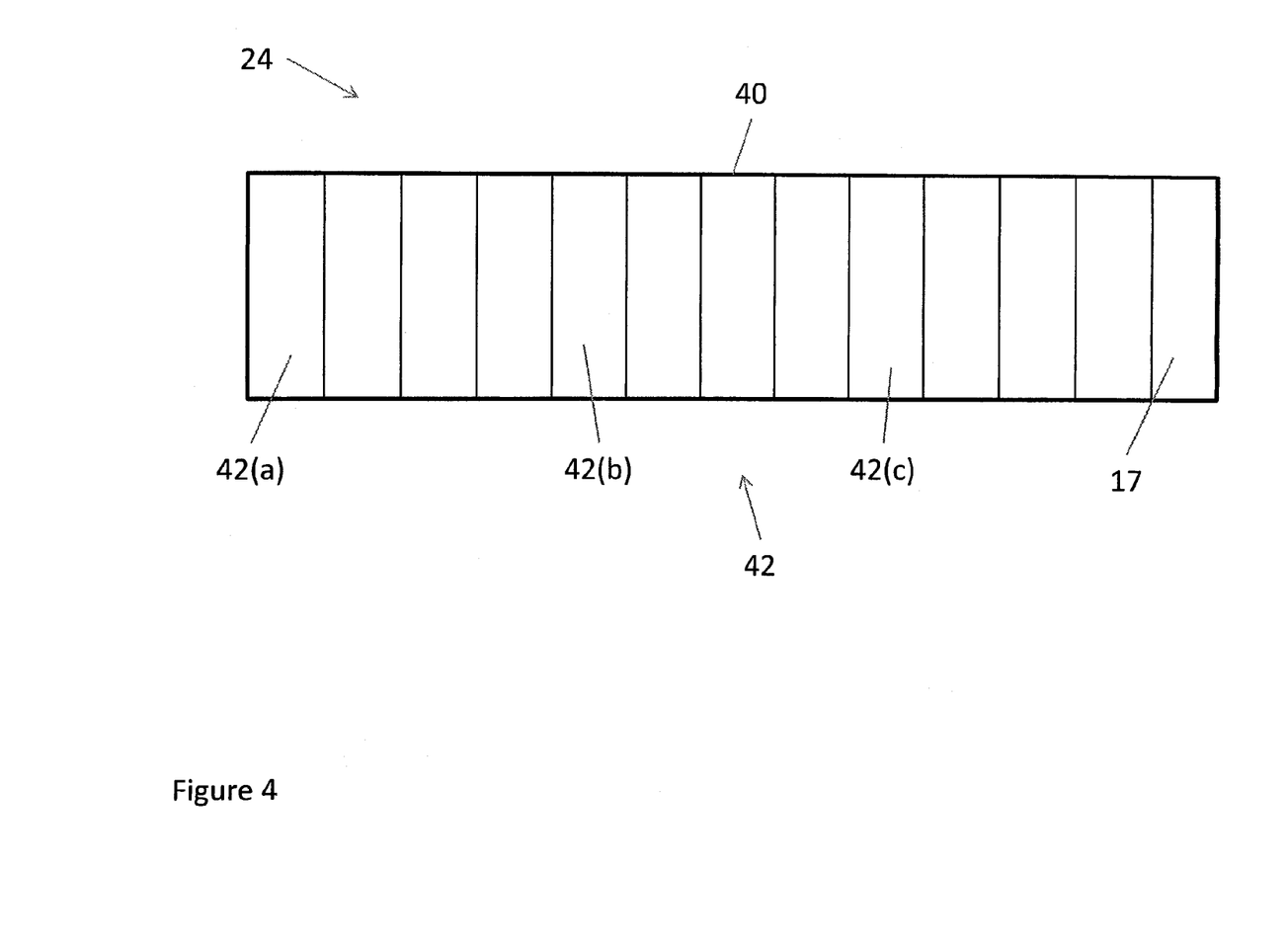
FIG. 4 is a schematic diagram illustrating a queue used by the event collector shown in FIG. 2.

FIG. 4 shows a queue 40 which is stored in memory 24 and contains high priority event notifications 42(a), 42(b), 42(c), ..., and 17 on which alert evaluation module 16 will apply an alert evaluation operation. Event notification 42(a) is at the front of queue 40; in other words, event notification 42(a) is the first in the queue on which alert evaluation module 16 performs the alert evaluation operation. Further back in queue 40 are event notifications 42(b) and 42(c).

Processor 22, in the simplest case, manages queue 40 in a FIFO manner. That is, once an event notification 17 is assigned a high priority, processor 22 treats that event notification 17 the same as the other event notifications 42. Being the most recent event notification to be assigned a high priority, event notification 17 is placed into the back of queue 40.

In some arrangements, however, processor 22 assigns a more detailed value, or sublevel, of a priority level to the event notifications 42 which processor 22 has assigned a high priority level. In this case, processor 22 sends an event notification having a higher priority sublevel than other event notifications in front of the other event notifications in queue 40. For example, in FIG. 3, rule 30(b) assigns a value of 3 to the PRIORITY_LEVEL parameter when EVENT_ORIGIN= 'Win2003Server.' If event notification 42(b) described a login failure coming from a device having the parameter EVENT_ORIGIN='Win2003Server,' then the total PRIORITY_LEVEL parameter for event notification 42(b) is 6, which, while being higher than threshold and for which event notification 42(b) is assigned a high priority, has a smaller PRIORITY_LEVEL value than that assigned to event notification 17 which EVENT_ORIGIN parameter had the value 'Exchange_server.' Processor 22 then places event notification 17 ahead of event notification 42(*b*) in queue 40.

It should be understood that processor 22 can be configured to adjust a population of queue 40 by adjusting the threshold value of the PRIORITY_LEVEL parameter. To continue the above example, if queue 40 is overpopulated, then processor 22 adjusts the threshold value of the PRIORITY_LEVEL parameter to be 8 rather than 5. On the other hand, if queue 40 is underpopulated, then processor 22 adjusts the threshold value of the PRIORITY_LEVEL parameter to be 3 rather than 5.

Returning to FIG. 1, alert evaluation module 16 is configured to check queue 40 for the presence of event notifications 42. In some arrangements where alert rules are not based on a set of rules from alert evaluation module 16, if queue 40 is empty, alert evaluation module 16 checks database 11 for event notifications which have a normal priority level and on which the alert evaluation operation has not been performed. Alert evaluation module 16 continues to perform this check of database 16 until alert evaluation module 16 detects a high priority event notification 42 in queue 40, at which time alert evaluation module performs the alert evaluation operation on high priority event notification 42.

It should be understood that the alert evaluation operation evaluates values of the parameters of an event notification based on parameter values of multiple, previous event notifications. For example, suppose that an event notification has a value of the parameter IP_ADDRESS equal to 1.2.3.4. The alert evaluation operation searched database 11 for other events involving this value of the parameter IP_ADDRESS. Compared with the event notification evaluation operation which checks rules set 19 for various parameter values associated with the event notification, the alert evaluation operation is resource intensive.

Because the expected number of event notifications tagged as having a high priority is typically a small fraction of the total number of incoming event notifications, the improved technique advantageously allows for the alert evaluation module 16 to generate alerts quickly and thus reduce the risk of compromising a device 13 on a network. The reason behind this is, as explained above, the event notification evaluation operation is less resource intensive than the alert evaluation operation; in essence, a large number of slow operations are replaced by a large number of fast operations and a small number of slow operations. Further, the additional time needed for a copy operation on the high priority event notifications is insignificant in comparison to the time needed for performing the alert evaluation operation on the incoming event notifications.

It should also be understood that processor 22 marks high priority event notifications 15 stored in database 11 as such within database 11 so that alert evaluation module 16 passes over such event notifications when checking database 11.

Figure 5:
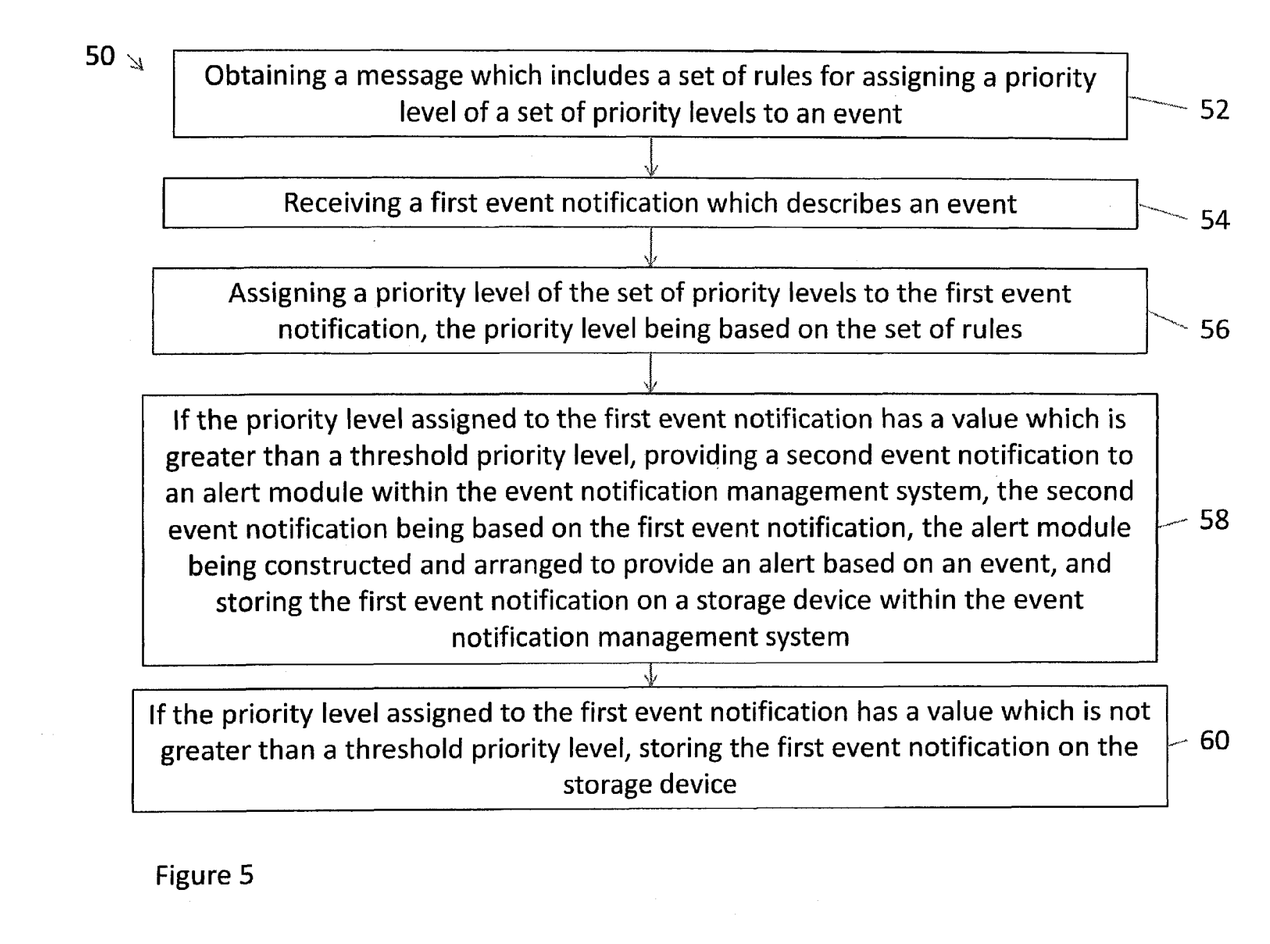
FIG. 5 is a flow chart illustrating a method of carrying out the improved technique within the electronic environment shown in FIG. 1.

FIG. 5 shows a flow chart which illustrates a method 50, carried out by processor 22, of identifying particular events for alerting within an event notification management system. In step 52, a message which includes a set of rules for assigning a priority level of a set of priority levels to an event is obtained. In step 54, a first event notification which describes an event is received. In step 56, a priority level of the set of priority levels is assigned to the first event notification, the priority level being based on the set of rules. In step 58, if the priority level assigned to the first event notification has a value which is greater than a threshold priority level, a second event notification is provided to an alert evaluation module within the event notification management system, the second event notification being based on the first event notification, the alert evaluation module being constructed and arranged to provide an alert based on an event, and the first event notification is stored on the storage device. In step 60, if the priority level assigned to the first event notification has a value which is not greater than a threshold priority level, the first event notification is stored on the storage device.

While various embodiments of the invention have been particularly shown and described, it will be understood by those skilled in the art that various changes in form and details may be made therein without departing from the spirit and scope of the invention as defined by the appended claims.

For example, it should be understood that the rules set 19 illustrated in FIG. 3 is not exhaustive. Specifically, another value of the EVENT_TYPE parameter is 'connection_permitted.'

It should also be understood that method 50 can be carried out with other components of event notification management system 9; for example, alert evaluation module 16 can be constructed and arranged to carry out method 50.

Furthermore, it should be understood that some embodiments are directed to event collector 14 which identifies particular events for alerting within event notification management system. Some embodiments are directed to event collector 14. Some embodiments are directed to a system which identifies particular events for alerting within event notification management system. Some embodiments are directed to a process of identifies particular events for alerting within event notification management system. Also, some embodiments are directed to a computer program product which enables computer logic to identify particular events for alerting within event notification management system.

In some arrangements, event collector 14 is implemented by a set of processors or other types of control/processing circuitry running software. In such arrangements, the software instructions can be delivered to event collector 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A computer-based method of identifying, within an event notification management system, particular events for alerting, the method comprising:
    obtaining a message which includes a set of rules for assigning a priority level of a set of priority levels to an event;
    receiving a first event notification which describes an event;
    assigning a priority level of the set of priority levels to the first event notification, the priority level being based on the set of rules;
    if the priority level assigned to the first event notification has a value which is greater than a threshold priority level:
        providing a second event notification to an alert evaluation module within the event notification management system, the second event notification being based on the first event notification, the alert evaluation module being constructed and arranged to provide an alert based on an event; and
        storing the first event notification on a storage device within the event notification management system; and if the priority level assigned to the first event notification has a value which is not greater than the threshold priority level:
storing the first event notification on the storage device;
wherein providing the second event notification includes sending, as the second event notification, a copy of the first event notification to the alert evaluation module when the priority level assigned to the first event notification has a value which is greater than the threshold priority level.

2. A method according to claim 1, wherein the first event notification includes a data packet having a packet header, the packet header including an identifier which identifies an origin of the event of the event notification;
wherein the set of rules includes an origin rule for assigning a priority level to an event notification based on the origin of the event described by the event notification; and
wherein assigning a priority level to the first event notification includes:
reading the origin of the event described by the first event notification; and
assigning the priority level to the first event notification based on the origin rule.

3. A method according to claim 2, wherein the origin rule includes a provision for assigning, to an event notification, one of a first priority level when the origin of the event described by the event notification is a first origin, or a second priority level when the origin of the event is a second origin, the first priority level having a value greater than the threshold level, the second priority level having a value less than the threshold level; and
wherein assigning a priority level to the first event notification further includes:
assigning the first priority level to the first event notification when the origin of the event described by the first event notification is the first origin, and assigning the second priority level to the first event notification when the origin of the event described by the first event notification is the second origin.

4. A method according to claim 3, wherein providing a second event notification to the alert evaluation module includes:
assigning a priority sublevel to the second event notification, each priority sublevel of the set of priority sublevels having a value which is distinct from values of the other priority sublevels of the set of priority sublevels;
wherein the method further comprises:
placing the second event notification into a queue according to the assigned value of the priority sublevel.

5. A method according to claim 4, wherein the method further comprises:
checking the queue for the presence of event notifications; and
sending event notifications stored on the storage device to the alert evaluation module when the queue has no event notifications, and not sending event notifications to the alert evaluation module when the queue has event notifications.

6. A method according to claim 2, wherein the set of rules is based on a set of alert rules;
wherein receiving a first event notification includes:
generating a schedule by which events received by a "pull" operation are prioritized according to the set of alert rules.

7. A method according to claim 2, wherein the set of rules further includes a connection rule specifying that event notifications which describe whether or not a connection was permitted at a node of a network be assigned a priority level according to whether or not the connection was permitted;
wherein assigning a priority level to the first event notification includes:
reading an event description from the data packet of the first event notification; and
assigning a priority level having a value greater than the threshold level to the event description when the event notifications describes a connection not permitted, and assigning a priority level having a value less than the threshold level to the event description when the event notifications describes a connection permitted.

8. A method as in claim 1, wherein the second event notification contains information representing the value of the priority level assigned to the first event notification; and
wherein the method further comprises adding, to the second event notification, the information representing the value of the priority level assigned to the first event notification after the value of the priority level has been assigned to the first event notification, the information added to the second event notification being used by the alert evaluation module to identify high priority event notifications placed in a queue.

9. A system constructed and arranged to identify particular events for alerting within the system, the system comprising:
an alert evaluation module;
a storage device; and
a collection system including:
a network interface;
a memory; and
a controller which includes controlling circuitry coupled to the memory, the controlling circuitry constructed and arranged to:
obtain a message which includes a set of rules for assigning a priority level of a set of priority levels to an event;
receive a first event notification which describes an event;
assign a priority level of the set of priority levels to the first event notification, the priority level being based on the set of rules;
if the priority level assigned to the first event notification has a value which is greater than a threshold priority level:
provide a second event notification to the alert evaluation module, the second event notification being based on the first event notification, the alert evaluation module being constructed and arranged to provide an alert based on an event; and
store the first event notification on the storage device;
and
if the priority level assigned to the first event notification has a value which is not greater than the threshold priority level:
store the first event notification on the storage device;
wherein the controlling circuitry constructed and arranged to provide the second event notification is further constructed and arranged to send, as the second event notification, a copy of the first event notification to the alert evaluation module when the priority level assigned to the first event notification has a value which is greater than the threshold priority level.

10. A system according to claim 9, wherein the first event notification includes a data packet having a packet header, the packet header including an identifier which identifies an origin of the event of the event notification;
   wherein the set of rules includes an origin rule for assigning a priority level to an event notification based on the origin of the event described by the event notification; and
   wherein assigning a priority level to the first event notification includes:
      reading the origin of the event described by the first event notification; and
      assigning the priority level to the first event notification based on the origin rule.

11. A system according to claim 10, wherein the origin rule includes a provision for assigning, to an event notification, one of a first priority level when the origin of the event described by the event notification is a first origin, or a second priority level when the origin of the event is a second origin, the first priority level having a value greater than the threshold level, the second priority level having a value less than the threshold level; and
   wherein assigning a priority level to the first event notification further includes:
      assigning the first priority level to the first event notification when the origin of the event described by the first event notification is the first origin, and assigning the second priority level to the first event notification when the origin of the event described by the first event notification is the second origin.

12. A system according to claim 11, wherein providing a second event notification to the alert evaluation module includes:
   assigning a priority sublevel to the second event notification, each priority sublevel of the set of priority sublevels having a value which is distinct from values of the other priority sublevels of the set of priority sublevels;
   wherein the controlling circuitry is further constructed and arranged to:
      place the second event notification into a queue according to the assigned value of the priority sublevel.

13. A system according to claim 12, wherein the controlling circuitry is further constructed and arranged to:
   check the queue for the presence of event notifications; and
   send event notifications stored on the storage device to the alert evaluation module when the queue has no event notifications, and not sending event notifications to the alert evaluation module when the queue has event notifications.

14. A system according to claim 10, wherein the set of rules is based on a set of alert rules;
   wherein receiving a first event notification includes:
      generating a schedule by which events received by a "pull" operation are prioritized according to the set of alert rules.

15. A system according to claim 10, wherein the set of rules further includes a connection rule specifying that event notifications which describe whether or not a connection was permitted at a node of a network be assigned a priority level according to whether or not the connection was permitted;
   wherein assigning a priority level to the first event notification includes:
      reading an event description from the data packet of the first event notification; and
      assigning a priority level having a value greater than the threshold level to the event description when the event notifications describes a connection not permitted, and assigning a priority level having a value less than the threshold level to the event description when the event notifications describes a connection permitted.

16. A computer program product having a non-transitory computer readable storage medium which stores code to identify particular events for alerting within an event notification management system, the code including instructions to:
   obtain a message which includes a set of rules for assigning a priority level of a set of priority levels to an event;
   receive a first event notification which describes an event;
   assign a priority level of the set of priority levels to the first event notification, the priority level being based on the set of rules;
   if the priority level assigned to the first event notification has a value which is greater than a threshold priority level:
      provide a second event notification to an alert evaluation module within the event notification management system, the second event notification being based on the first event notification, the alert evaluation module being constructed and arranged to provide an alert based on an event; and
      store the first event notification on a storage device within the event notification management system; and
   if the priority level assigned to the first event notification has a value which is not greater than the threshold priority level:
      store the first event notification on the storage device;
   wherein providing the second event notification includes sending, as the second event notification, a copy of the first event notification to the alert evaluation module when the priority level assigned to the first event notification has a value which is greater than the threshold priority level.

17. A computer program product according to claim 16, wherein the first event notification includes a data packet having a packet header, the packet header including an identifier which identifies an origin of the event of the event notification;
   wherein the set of rules includes an origin rule for assigning a priority level to an event notification based on the origin of the event described by the event notification; and
   wherein assigning a priority level to the first event notification includes:
      reading the origin of the event described by the first event notification; and
      assigning the priority level to the first event notification based on the origin rule.

18. A computer program product according to claim 17, wherein the origin rule includes a provision for assigning, to an event notification, one of a first priority level when the origin of the event described by the event notification is a first origin, or a second priority level when the origin of the event is a second origin, the first priority level having a value greater than the threshold level, the second priority level having a value less than the threshold level; and
   wherein assigning a priority level to the first event notification further includes:
      assigning the first priority level to the first event notification when the origin of the event described by the first event notification is the first origin, and assigning the second priority level to the first event notification when the origin of the event described by the first event notification is the second origin.

19. A computer program product according to claim 18, wherein providing a second event notification to the alert evaluation module includes:
    assigning a priority sublevel to the second event notification, each priority sublevel of the set of priority sublevels having a value which is distinct from values of the other priority sublevels of the set of priority sublevels;
    wherein the code further includes instructions to:
        place the second event notification into a queue according to the assigned value of the priority sublevel.

20. A computer program product according to claim 19, wherein the code further includes instructions to:
    check the queue for the presence of event notifications; and
    send event notifications stored on the storage device to the alert evaluation module when the queue has no event notifications, and not sending event notifications to the alert evaluation module when the queue has event notifications.

21. A computer program product according to claim 17, wherein the set of rules is based on a set of alert rules;
    wherein receiving a first event notification includes:
        generating a schedule by which events received by a "pull" operation are prioritized according to the set of alert rules.

* * * * *